Patented June 6, 1933

1,913,113

UNITED STATES PATENT OFFICE

WILLIS A. GIBBONS, OF MONTCLAIR, NEW JERSEY, ASSIGNOR TO THE NAUGATUCK CHEMICAL COMPANY, OF NAUGATUCK, CONNECTICUT, A CORPORATION OF CONNECTICUT

METHOD OF IMPROVING THE PROPERTIES OF RUBBER AND PRODUCT

No Drawing. Original application filed March 8, 1930, Serial No. 434,462. Divided and this application filed March 8, 1930. Serial No. 434,463.

This invention relates to a method of improving the physical properties of rubber and to the product, more particularly to the improvement of the properties of alkaline rubbers, both in their unvulcanized and vulcanized condition.

The present application is a division of my application Serial No. 434,462, filed March 8, 1930.

In the preparation and manipulation of raw and reclaimed rubber for the manufacture of rubber or rubber and fabric articles, certain physical properties are desired, such as ease of breakdown of the rubber on the mill, smooth calendering, and plasticity. In vulcanized articles, particularly those composed of rubber and fibrous material which are subjected to a flexing action in use, such as tires, belting and hose, it is desired to obtain the greatest resistance to separation between the rubber and fibre caused by the flexing action.

It has been found that raw rubbers which are decidedly alkaline, such as those to which alkaline materials have been directly added, and reclaimed rubbers which have been reclaimed by the alkali process, are deficient in some or all of the properties of easy breakdown, smooth calendering and extruding, and when such rubbers are incorporated in rubber and fabric articles, the articles are deficient in resistance to flexing. The present invention therefore relates to a method for improving the physical properties of such alkaline rubber or alkaline reclaim during its manipulation prior to vulcanization and to improving the flexing ability of the vulcanized material when included in a rubber and fibre article. The invention is not limited however in its application to such rubbers, but also decidedly improves the breakdown, calendering and extruding ability, and flexing ability of other rubbers such as all-solids-content-latex evaporated rubbers, coagulated rubbers, and in general those which show an alkaline ash, and it is also applicable to combinations of any of the above rubbers.

An object of the present invention is to provide a process for obtaining a vulcanized rubber of improved flexing characteristics. Another object is to provide a process for softening, and in general improving the breakdown, calendering and extruding properties of rubbers during manufacturing operations. Another object is to provide improved rubber products, particularly vulcanized combinations of the treated material and fibers.

The invention consists broadly in incorporating in solid rubber having an alkaline ash, heavy metal water soluble salts of acids capable of decomposing alkali proteinates and alkali soaps, working to a smooth, plastic condition, and if desired vulcanizing, and it also consists in the products obtained.

While as previously stated, the invention is applicable to raw rubber to which an alkali has been directly added or to an alkali treated reclaim, it is also of value in the treatment of any rubbers which show an alkaline ash, such as coagulated rubbers, all-solids-content-latex evaporated rubbers, or mixtures of any of these. In carrying out the invention the heavy metal salts, either as such or in solution, are incorporated with the solid rubber either on the ordinary form of mixing mill, or in a closed mixer or in any other suitable manner. Rubber to which such heavy metal salts have been added softens more readily in milling, is capable of smooth calendering and extruding, and in general has its processing characteristics improved, and upon vulcanization displays a greatly increased flexing ability. As illustrations of the improvement in flexing by the use of the process the following examples are given:

Example 1

| | | |
|---|---|---|
| Pale crepe | 50 | 50 |
| Smoked sheet | 50 | 50 |
| Reclaim (alkaline) | 75 | 75 |
| Spindle oil | 5 | 5 |
| Zinc oxide | 5 | 5 |
| Heptaldehyde-aniline accelerator | .5 | .5 |
| Zinc nitrate | ------ | 2 |
| Sulphur | 3.75 | 3.75 |

| Cure | Flexing in kilocycles | |
|---|---|---|
| 30′ @ 45# | 12.8 | 22.0 |
| 45′ @ 45# | 10.5 | 27.9 |
| 60′ @ 45# | 10.8 | 15.4 |
| 75′ @ 45# | 13.5 | 9.7 |

Example 2

| | | |
|---|---|---|
| Pale crepe | 50 | 50 |
| Smoked sheet | 50 | 50 |
| Whole tire reclaim (alkali process) | 75 | ------ |
| Whole tire reclaim (alkali process with 2% zinc chloride) | ------ | 75 |
| Spindle oil | 8 | 8 |
| Zinc oxide | 5 | 5 |
| Heptaldehyde-aniline accelerator | 0.5 | 0.7 |
| Sulphur | 3.75 | 3.75 |

| Cure | Flexing in kilocycles | |
|---|---|---|
| 30′ @ 45# | 11.4 | ------ |
| 45′ @ 45# | 10.8 | 37.2 |
| 60′ @ 45# | 16.6 | 38.0 |
| 75′ @ 45# | 11.7 | 66.5 |
| 90′ @ 45# | 12.2 | 58.2 |

Example 3

| | | |
|---|---|---|
| *Spray dried rubber | 100 | 100 |
| Spindle oil | 5 | 5 |
| Zinc oxide | 5 | 5 |
| Heptaldehyde-aniline accelerator | .5 | .5 |
| Zinc chloride | ------ | 1.6 |
| Sulphur | 3.75 | 3.75 |

| Cure | Flexing in kilocycles | |
|---|---|---|
| 30′ @ 45# | 13.8 | 50.5 |
| 45′ @ 45# | 12.8 | 63.9 |
| 60′ @ 45# | 15.5 | 86.1 |
| 75′ @ 45# | 12.9 | 72.1 |
| 90′ @ 45# | 11.7 | 94.3 |

Example 4

| | | |
|---|---|---|
| *Spray dried rubber | 100 | 100 |
| Whole tire reclaim (alkali process) | 75 | ------ |
| Whole tire reclaim (alkali process with 4.7% zinc chloride) | ------ | 75 |
| Spindle oil | 8 | 8 |
| Zinc oxide | 5 | 5 |
| Heptaldehyde-aniline accelerator | 0.5 | 0.75 |
| Sulphur | 5.5 | 5.5 |

| Cure | Flexing in kilocycles | |
|---|---|---|
| 30′ @ 45# | 8.0 | 27.6 |
| 45′ @ 45# | 6.3 | 33.0 |
| 60′ @ 45# | 6.4 | 56.7 |
| 75′ @ 45# | 5.3 | 66.7 |
| 90′ @ 45# | 5.1 | 52.6 |

(* From latex containing formaldehyde and a sulphonated fatty acid.)

Example 5

| | | |
|---|---|---|
| *Spray dried rubber | 100 | 100 |
| Reclaim (alkaline) | 75 | 75 |
| Spindle oil | 5 | 5 |
| Zinc oxide | 5 | 5 |
| Heptaldehyde-aniline accelerator | .5 | .5 |
| Zinc chloride | ------ | 2.5 |
| Sulphur | 3.75 | 3.75 |

| Cure | Flexing in kilocycles | |
|---|---|---|
| 30′ @ 45# | 8.8 | 19.5 |
| 45′ @ 45# | 6.5 | 24.2 |
| 60′ @ 45# | 5.2 | 23.8 |
| 75′ @ 45# | 4.5 | 20.3 |
| 90′ @ 45# | 4.4 | 24.4 |

Example 6

| | | | |
|---|---|---|---|
| Smoked sheet rubber | 33 | 33 | 33 |
| Blended roll brown (off grade plantation rubber) | 67 | 67 | 67 |
| Tire reclaim (alkali process) | 75 | ------ | ------ |
| Tire reclaim (alkali process, with 1.6% ZnCl²) | ------ | 75 | 75 |
| Zinc oxide | 5 | 5 | 5 |
| Spindle oil | 4 | 4 | 4 |
| Heptaldehyde-aniline accelerator | .5 | 1.25 | 1.5 |
| Sulphur | 5 | 5 | 5 |

| Cure | Flexing in kilocycles | | |
|---|---|---|---|
| 30′ @ 45# | 11.2 | 24.6 | 24.0 |
| 40′ @ 45# | 13.1 | 26.2 | 23.9 |
| 50′ @ 45# | 13.0 | 19.2 | 21.0 |
| 60′ @ 45# | 11.7 | 14.2 | 22.8 |

| | Tensile in pounds | | |
|---|---|---|---|
| 30′ @ 45# | 1775 | 1813 | 1693 |
| 40′ @ 45# | 1757 | 1635 | 2067 |
| 50′ @ 45# | 1565 | 1900 | 1735 |
| 60′ @ 45# | 1338 | 1703 | 1659 |

In the above example the reclaim in the blank and the zinc chloride treated reclaim were made from the same batch of digested tire stock.

Example 7

| | | | |
|---|---|---|---|
| Smoked sheet rubber | 33 | 33 | 33 |
| Blended roll brown (off grade plantation rubber) | 67 | 67 | 67 |
| Tire reclaim (alkali process) | 75 | ------ | ------ |
| Tire reclaim (alkali process, with 1.4% ZnCl²) | ------ | 75 | ------ |
| Tire reclaim (alkali process, with 1% ZnCl²) | ------ | ------ | 75 |
| Zinc oxide | 5 | 5 | 5 |
| Spindle oil | 4 | 4 | 4 |
| Heptaldehyde-aniline accelerator | .5 | 1.25 | 1 |
| Sulphur | 5 | 5 | 5 |

| Cure | Flexing in kilocycles | | |
|---|---|---|---|
| 30′ @ 45# | 11.2 | 25.0 | 16.6 |
| 40′ @ 45# | 13.1 | 23.6 | 13.8 |
| 50′ @ 45# | 13.0 | 22.8 | 13.8 |
| 60′ @ 45# | 11.7 | 24.7 | 12.3 |

| | Tensile in pounds | | |
|---|---|---|---|
| 30′ @ 45# | 1775 | 2193 | 2575 |
| 40′ @ 45# | 1757 | 1998 | 2097 |
| 50′ @ 45# | 1565 | 1913 | 2063 |
| 60′ @ 45# | 1338 | 2078 | 2140 |

In the above example the reclaim in the blank and the zinc chloride treated reclaim were made from the same basic tire stock but not from the same digester run.

*Example 8*

| | | |
|---|---|---|
| Smoked sheet rubber | 33 | 33 |
| Blended roll brown (off grade plantation rubber) | 67 | 67 |
| Tire reclaim (alkali process) | 75 | |
| Tire reclaim (alkali process, with 1.6% ZnCl₂) | | 75 |
| Zinc oxide | 5 | 5 |
| Spindle oil | 4 | 4 |
| Heptaldehyde-aniline accelerator | .5 | 1.25 |
| Sulphur | 5 | 5 |

| Cure | Flexing in kilocycles | |
|---|---|---|
| 30' @ 45# | 15.5 | 34.6 |
| 40' @ 45# | 16.1 | 36.2 |
| 50' @ 45# | 16.4 | 30.2 |
| 60' @ 45# | 14.9 | 33.1 |

| | Tensile in pounds | |
|---|---|---|
| 30' @ 45# | 1611 | 1928 |
| 40' @ 45# | 1617 | 2242 |
| 50' @ 45# | 1617 | 1960 |
| 60' @ 45# | 1714 | 2297 |

In the above example the reclaim in the blank and the zinc chloride treated reclaim were made from the same batch of digested tire stock.

The flexing data given in the above examples was obtained by the use of a commonly applied test in the tire industry, in which alternate plies of the rubber to be tested and fabric are built up to the desired thickness, cut into pads which are usually 5" x 8", and the pads then vulcanized in a mold. After vulcanization the pads are removed from the mold and allowed to stand for about 36 hours, after which they are cut into strips usually 1" x 8". The strips are then subjected to a flexing test in which each strip is secured in a machine by its ends while the intermediate portion of the strip is in contact with a weighted pulley. The strip is then pulled back and forth around the pulley at the rate of about 160 cycles per minute until separation of the plies begins, and the number of cycles required to cause separation of the rubber from the fabric is noted.

In the above examples, the fabric plies were made according to the process disclosed in Hopkinson Patent No. 1,424,020, in which the fabric is weftless and consists only of parallel cords impregnated with and united by rubber deposited directly from latex. The latex used for this purpose was compounded with spindle oil, formaldehyde-ethylamine condensation product, soap and sulphur.

Among other heavy metal water soluble salts which may be used in carrying out the process of the invention are mercuric chloride and zinc acetate. In general, it has been found that the heavy metal salts which are suitable for the process are water soluble salts of water soluble strong acids capable of decomposing alkali proteinates and alkali soaps, and having the ability to greatly diminish the alkalinity of the rubber, in some cases to a point approaching neutrality or somewhat below it, that is, to or below pH 7. The increase in flexing capacity of articles made according to the present invention is most pronounced where the rubbers treated are definitely alkaline, such as those to which fixed alkali has been added, and alkali processed reclaims, i. e. vulcanized rubbers which have been restored to a plastic condition to render them suitable for re-use in rubber manufacturing operations, but there is also an improvement in the case of all rubbers showing an alkaline ash, such as all-solids-content-latex rubbers, or with various combinations of any of the above rubbers.

The precise amounts of the heavy metal salt to be added will necessarily vary with the character of the mix, and in general, the more alkaline the rubber mix, the greater the amount of any given heavy metal salt will be required, and this amount can be readily determined by those skilled in the art.

It will be seen that by the use of the invention the flexing capacity of rubber and rubber and fabric articles may be very greatly increased, and as a result either articles of marked superiority in this respect are obtained with the usual stocks, or much cheaper rubber stocks may be used and yet produce flexing capacity equal to or greater than much more expensive stocks at present in use. The invention is capable of wide use in the manufacture of all rubber articles where good flexing is desirable, and it is of particular value for use with the usual vulcanized articles of commerce which are built up of layers of fabric and rubber, such as tires, belting, hose, etc. The improvement in milling properties is another valuable feature of the invention, as the softening of the rubber increases the speed of operation, and the uniform plasticity aids greatly in smooth and uniform calendering and extruding. Where the term "rubber" is used in the claims without qualification, it is intended to cover reclaim.

Having thus described my invention, what I claim and desire to protect by Letters Patent is:

1. A method of improving the physical properties of rubber before and after its vulcanization, which comprises incorporating in a body of solid rubber at the beginning of its breakdown a plasticizing agent comprising a zinc salt of an acid selected from the group consisting of hydrochloric and nitric acids, and working the rubber to a uniformly soft, plastic condition.

2. A method of improving the physical properties of rubber before and after its vulcanization, which comprises plasticizing in a body of solid rubber by adding at the beginning of its breakdown a zinc salt of an acid selected from the group consisting of hydrochloric and nitric acids, then incorporating the rubber in a rubber and fibre article, and vulcanizing.

3. A method of improving the physical properties of rubber before and after its vulcanization, which comprises incorporating in a body of solid rubber before vulcanization zinc chloride, working the rubber to a uniformly soft, plastic condition, incorporating it in a rubber and fibre article, and vulcanizing.

4. The plastic product of raw rubber and alkaline reclaim plasticized in the presence of a water soluble heavy metal salt of a water soluble acid strong enough to decompose alkali proteinates and alkali soaps, the pH of the water extract of said product not exceeding approximately 7.

5. The plastic product of an alkaline-ash solid rubber plasticized at the beginning of its breakdown by the addition of a zinc salt of an acid selected from the group consisting of nitric and hydrochloric acids.

6. A vulcanized article comprising fibre and a rubber stock derived from a mixture of solid rubber and a zinc salt of an acid selected from the group, consisting of nitric and hydrochloric acids.

7. A vulcanized article comprising laminations of fibrous material and a rubber stock derived from raw rubber, reclaim and a salt selected from the group consisting of zinc nitrate, zinc chloride, zinc acetate, and mercuric chloride.

8. A method of improving the physical properties of rubber before and after its vulcanization, which comprises incorporating in raw rubber and reclaim before vulcanization, a water soluble zinc salt of a water soluble acid capable of decomposing alkali proteinates and alkali soaps, forming a rubber and fibre article therefrom, and vulcanizing.

9. A method of improving the physical properties of rubber before and after its vulcanization, which comprises plasticizing raw rubber and reclaim by adding at the beginning of breakdown a salt selected from the group consisting of zinc nitrate, zinc chloride, zinc acetate and mercuric chloride, forming a rubber and fibre article from the product, and vulcanizing.

10. The process consisting of forming a rubber compound including raw rubber, reclaim and zinc chloride, making a rubber and fibre article therefrom, and vulcanizing, whereby the flexing properties of the article are increased.

Signed at Passaic, county of Passaic, State of New Jersey, this 5th day of March, 1930.

WILLIS A. GIBBONS.